(12) United States Patent
Su

(10) Patent No.: US 12,131,427 B2
(45) Date of Patent: Oct. 29, 2024

(54) MEASUREMENT ACCURACY ENHANCEMENT BY USING SEMANTIC SEGMENTATION

(71) Applicant: STREEM, LLC, Portland, OR (US)

(72) Inventor: Huapeng Su, Portland, OR (US)

(73) Assignee: STREEM, LLC, Portland, OR (US)

( * ) Notice: Subject to any disclaimer, the term of this patent is extended or adjusted under 35 U.S.C. 154(b) by 110 days.

(21) Appl. No.: 17/878,789

(22) Filed: Aug. 1, 2022

(65) Prior Publication Data

US 2023/0290069 A1 Sep. 14, 2023

Related U.S. Application Data

(60) Provisional application No. 63/318,699, filed on Mar. 10, 2022.

(51) Int. Cl.
*G06T 17/20* (2006.01)
*G06T 7/60* (2017.01)
*G06V 10/26* (2022.01)
*G06V 10/764* (2022.01)

(52) U.S. Cl.
CPC .............. *G06T 17/205* (2013.01); *G06T 7/60* (2013.01); *G06V 10/26* (2022.01); *G06V 10/764* (2022.01); *G06T 2207/10016* (2013.01); *G06T 2207/10024* (2013.01); *G06T 2207/10028* (2013.01); *G06T 2210/56* (2013.01)

(58) Field of Classification Search
CPC .............. G06T 17/205; G06T 7/60; G06T 2207/10016; G06T 2207/10024; G06T 2207/10028; G06T 2210/04; G06V 10/26; G06V 10/764
USPC .......................................... 345/423
See application file for complete search history.

(56) References Cited

U.S. PATENT DOCUMENTS

| 6,191,796 | B1* | 2/2001 | Tarr | G06F 3/04815 |
| | | | | 345/581 |
| 2010/0027845 | A1* | 2/2010 | Kim | G06V 40/28 |
| | | | | 382/107 |
| 2021/0142497 | A1* | 5/2021 | Pugh | G06T 19/006 |

\* cited by examiner

*Primary Examiner* — Gordon G Liu
(74) *Attorney, Agent, or Firm* — Schwabe Williamson & Wyatt

(57) ABSTRACT

A mesh model of a 3D space is modified based on semantic segmentation data to more accurately represent boundaries of an object in the 3D space. In one aspect, semantic segmentation images define one or more boundaries of the object. The semantic segmentation images are projected to a 3D mesh representation of the 3D space, and the 3D mesh representation is updated based on the one or more boundaries in the projected semantic segmentation image. In another aspect, the 3D mesh representation is updated based on one or more boundaries defined by the semantic segmentation images as applied to a point cloud of the 3D space.

20 Claims, 13 Drawing Sheets

MEASUREMENT ACCURACY ENHANCEMENT BY USING SEMANTIC SEGMENTATION

PRIORITY CLAIM

This application claims the benefit of U.S. provisional patent application No. 63/318,699, filed Mar. 10, 2022, titled "Measurement Accuracy Enhancement By Using Semantic Segmentation," and incorporated herein by reference.

TECHNICAL FIELD

The present disclosure relates to the field of photogrammetry, and specifically to the generation of a mesh model of a three-dimensional (3D) space from captured images and depth data.

BACKGROUND

Devices such as smartphones and tablets are increasingly capable of measuring and/or computing depth data of images or videos they capture, which in turn are useful for supporting augmented reality (AR) and/or other applications involving 3D spaces. These captured images or video and derived or captured depth data may be processed using various algorithms to detect features in the video, such as planes, surfaces, faces, and other recognizable shapes. These detected features, combined in some implementations with data from depth sensors and/or motion information captured from motion sensors such as a Micro-Electro-Mechanical System (MEMS) gyroscope and accelerometers, can be used by software in creating a point cloud in a 3D space. A 3D mesh representation of the point cloud can in turn be obtained to represent the 3D space more efficiently. The 3D mesh include vertices which represents boundaries of real objects in the 3D space. The point cloud or 3D mesh enables operations such as measurements of physical dimensions of the real objects.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
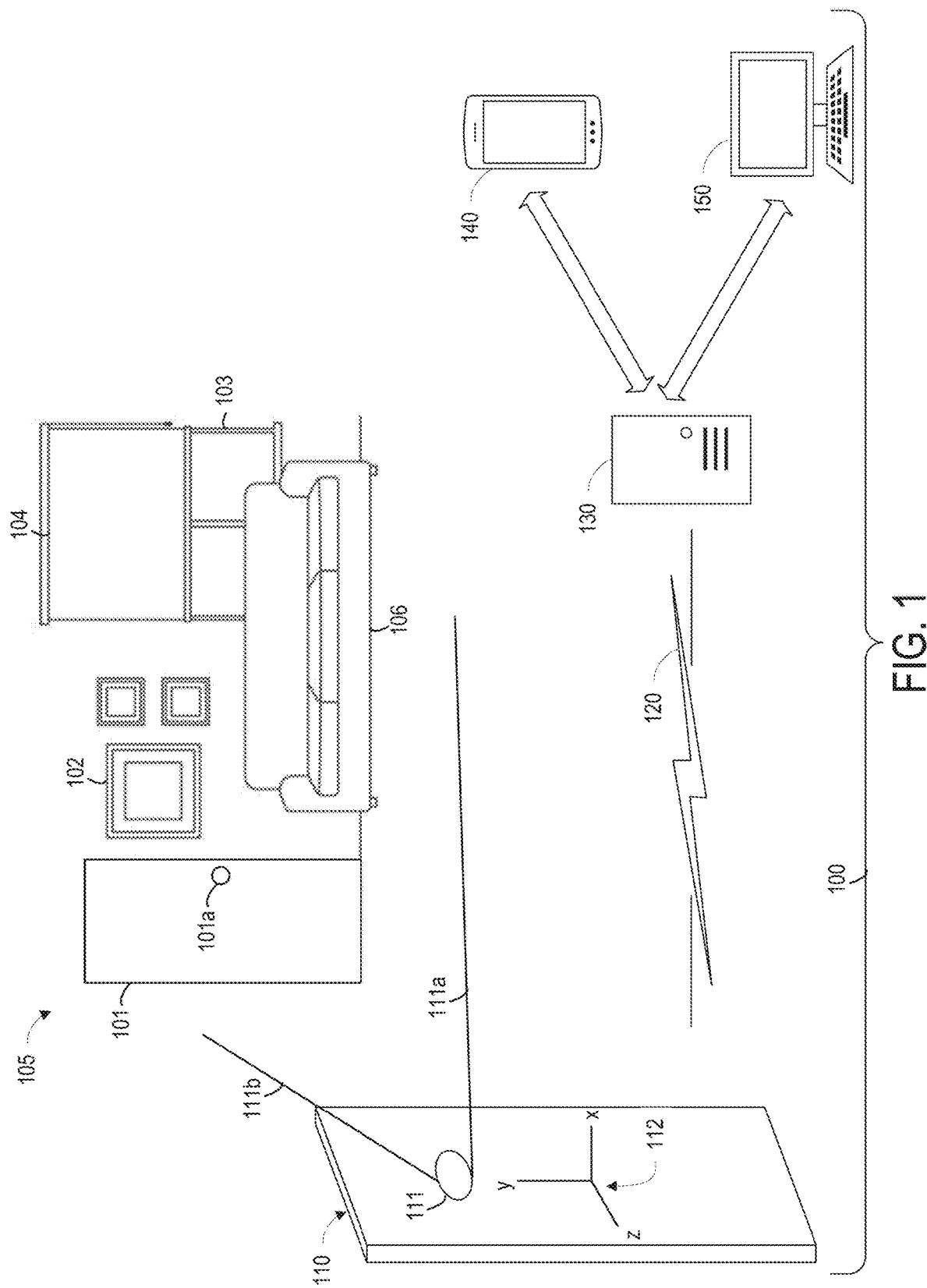
FIG. 1 illustrates a block diagram of the components of a system for capturing an image and corresponding depth data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

People increasingly rely upon remote communications technology to interact with each other. Modern smartphones, as well as camera-equipped laptops and desktop computers, can support the exchange of video data, to allow video chat as well as remote collaboration tools. For example, video conferencing can be blended with screen sharing and collaborative editing tools to allow a group of people who are remote from each other to collectively work on a document or other project over a video link.

As communications technology continues to advance, modern systems can additionally capture and/or transmit spatial data associated with video and audio. Systems can derive spatial data using various photogrammetric techniques, through which 3D spatial relationships can be ascertained. Depending upon the capabilities of a capturing device, depth data may be directly measured or calculated on the fly from captured video, possibly in conjunction with spatial position sensors in the capturing device. For example, most modern smartphones are equipped with an array of sensors beyond cameras and microphones; a modern smartphone may also include depth sensing, such as a Light Detection and Ranging (LiDAR) imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, the array of sensors allow for the relatively accurate capture and/or calculation of depth information for a captured scene.

This depth information can be provided as a point cloud, in one approach. The point cloud in turn can be used to construct a mesh representation or model of a 3D space. The mesh representation can be obtained by repeatedly connecting sets of three depth points or vertices together with edges to form a mesh of triangles that approximates the 3D space from which the depth information was obtained. The mesh representation can be more generally based on the point cloud, where the number of vertices can be less than the number of points in the point cloud so the depth information can be represented more compactly.

The depth information may be obtained by using a suitably equipped device to scan or capture the 3D space. For example, the device may include a camera capable of capturing still or video images, and depth scanning sensors. The device can be static or moved such as by panning to capture a portion, or a 360 degree view, of the space. Further, because the position of the capturing device within the 3D space can be known relative to the depth data and determined with respect to each successive frame of video simultaneously captured by the device, extracted video frames can be mapped onto the 3D mesh to create a relatively realistic approximation of the 3D space.

For example, a user in their home may capture images of doors, cabinets and appliances in their kitchen, or images of furniture, wall hangings and other decor in a living room, for use in planning a remodeling or redecorating project.

However, the 3D mesh may not accurately identify the various objects. This is especially true for objects which may be essentially coplanar, such as a door and a surrounding wall, and therefore at the same distance from the camera.

This problem can be understood by considering a triangular mesh in which the surface geometry of the objects is represented by triangular faces. Each triangle is defined by three vertices and the three edges that connect the vertices. Because of a limited storage capacity, the number of triangles is limited. As a result, the vertices of the mesh may not correspond to the edges, corners or other features of the objects.

This results in inaccuracies in representing the objects such as when obtaining measurements of the objects.

In some solutions involving scanning of a 3D space, the geometry information (from depth data) and color information are recorded but only the geometry information is heavily used. Using the geometry information alone to recognize objects is very challenging or impossible when the objects are on the same flat surface, such as is the case with doors, windows, wall hangings and a surrounding wall.

The techniques described herein address the above and other issues. The techniques include current semantic segmentation techniques which perform well on images, to turn color information into semantic information. The semantic segmentation techniques can recognize that a door has one color and a surrounding wall has another color, for example. By aligning the semantic segmentation information with the geometry information, objects such as doors, windows and wall hangings can be easily separated from a surrounding flat surface. This allows the boundaries of the objects to be accurately identified to allow accurate measuring of the size, area and position of the door, window or wall hanging, for instance.

In one aspect, a mesh representation of a 3D space is updated based on semantic segmentation images. These images comprise pixels of color data, where the pixels are classified as belonging to one or more recognized objects. A semantic segmentation process can be trained to recognize different objects which are expected to be in a 3D space. For example, when the 3D space is a kitchen, the expected objects can include doors, cabinets and appliances. When the 3D space is a living room, the expected objects can include furniture, wall hangings and other decor.

In one aspect, a capturing device captures both color images and depth data of a 3D space. The depth data comprises a 3D point cloud where each point is at a specified distance from the capturing device in a direction in which the capturing device is aimed. The capturing device can be moved around the 3D space so that it captures the images and depth data of the objects at different distances and from different angles or perspectives.

The color images are processed using a semantic segmentation process to obtain semantic segmentation images which identify the objects in the 3D space. Additionally, the depth data is processed to obtain a mesh representation of the 3D space. The mesh representation comprises polygon faces, such as triangles, which represent a surface of the objects.

In one approach, the mesh representation can be updated, e.g., refined, by projecting the semantic segmentation images to the mesh representation. A boundary of an object is determined from the semantic segmentation images and this boundary becomes a new edge in the mesh representation. Specifically, the faces of the mesh representation are split to form new, smaller faces based on the object boundary as determined by the semantic segmentation images.

In another approach, the mesh representation can be updated by projecting the semantic segmentation images to the point cloud. A boundary of an object is determined from the points which are encompassed by a portion of the semantic segmentation images which is classified as belonging to the object, and this boundary becomes a new edge in the mesh representation.

Moreover, a line can be fit to different boundaries of a given object from different semantic segmentation images using averaging or regression, for example, to obtain a representative boundary of the object. The faces of the mesh representation are then split based on fitted line of the representative boundary, which can be straight or curved, for instance.

The updated mesh representation of an object can be used for various purposes including obtaining measurements of the object such as height, width and area.

An example method includes a first operation of inputting sources, including a sequence of color and depth frame pairs, a camera pose for every color and depth frame pair, and a mesh of the frame pair sequence. Second, a deep-learning-based algorithm is used to obtain semantic segmentation images from the color texture images. The semantic segmentation algorithm can be trained to recognize different objects of interest.

In a third operation, one approach is to project semantic segmentation images to the faces on the mesh with weights associated with the distance of the object from the capturing device. For example, a closer view will have a higher weight because, for the same face, more pixels are projected from the closer view semantic segmentation image, which means more detail is preserved in the face. However, each angle of the capturing device can have its own noise and blind zone, so multiple projections from different angles are preferable if available, compared to fully trusting one projection. The different projections can be leveraged with different weights to obtain a processed projection for the corresponding face.

Another approach of the third operation is to align the semantic segmentation image with the depth image, project the depth image to space, and then accumulate those 3D points with the same class/object type. This approach may use a closer view for better accuracy.

Fourth, with one or more object boundaries obtained from the third step, the boundaries are used to cut or split the input mesh. This involves splitting the faces on the mesh which contain the object of interest. The split faces can be, e.g., 2-4 times finer, depending on how the mesh is formed and where the object boundary is located on the faces. For the example of a door object further below, the splitting of the faces allows a more accurate definition of the edges of the door and also provides a straight line boundary which follows the actual boundary of the door. This allows for a better estimation for measurements.

The method achieves three goals, including improving the accuracy of: the position of the edge/boundary of an object, the area/size of the object, and the estimated position of the object.

The above and other benefits will be further understood in view of the following.

FIG. 1 illustrates a block diagram of the components of a system 100 for capturing an image and corresponding depth data, according to various embodiments. The system 100 may include a user device 110, e.g., a capturing device, such as a smartphone, tablet, desktop or laptop computer, two-in-one (a portable computer that includes features of both tablets and laptops), hybrid, wearable computer such as smart glasses or a smartwatch, or any other computing device that can accept a camera and provide positional information, as will be discussed in greater detail herein. The device may be implemented as a computer device 1200 such as discussed in connection with FIG. 12. User device 110 further may include a camera 111 and a spatial position sensor 112 (depicted by a series of axes), which provides information about the spatial position of camera 111. It will be understood that camera 111 and spatial position sensor 112 may be contained within the body of device 110, as depicted in this example. Camera 111 is used to capture the surrounding environment of device 110, and by extension, the user. The camera can capture images of the space 105 within a field of view represented by boundary lines 111a and 111b. The environment may be a 3D space 105 such as a room, and may include one or more three-dimensional objects. In this example, the 3D space is a room which includes objects such as a door 101 with door knob 101a, a frame picture 102 (e.g., a wall hanging), a window 103, a shade 104 for the window and a sofa 106.

Camera 111 may be any camera that can provide a suitable video stream for the intended purpose of user device 110. Where user device 110 is implemented as a smartphone or tablet, camera 111 may be one or more built-in cameras. In other embodiments, such as where user device 110 is a laptop, camera 111 may be built in or may be a separate, external unit. A suitable video stream may be a digital video stream, and may be compressed in embodiments using Advanced Video Codec High Definition (AVC-HD), H.264 (also known as MPEG-4 Part 10, Advanced Video Coding), MPEG-4, or another suitable compression scheme. Camera 111 may be configured to output standard or high-definition video, 4K video, or another resolution of video suitable for the intended purpose of camera 111 and user device 110. In other embodiments, the camera 111 of user device 110 may comprise multiple cameras or similar sensors, where one or more of the sensors may be configured to directly detect depth points, such as a 3D camera, LiDAR, or other suitable depth-sensing technology. In such embodiments, a point cloud of any space captured by camera 111 may be able to be at least partially obtained via direct measurement from the depth-sensing technology.

Spatial position sensor 112 may be configured to provide positional information about camera 111, such as the cameras pan and tilt. Other measured positional vectors may include camera movements, such as the camera rising or falling, or moving laterally. Spatial position sensor 112 may be implemented with micro or MEMS sensors, such as gyroscopes to measure angular movements and accelerometers to measure linear movements such as rises, falls, and lateral movements. In other embodiments, spatial position sensor 112 may be implemented using any suitable technology capable of measuring spatial movements of camera, including but not limited to depth sensors of the camera 111.

In some embodiments, spatial position sensor 112 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 130, with which user device 110 communicates via a communication channel 120. Central server 130 may act to receive information from user device 110 such as video and depth data, which may be used with process flow 200 or method 300, discussed below. In some embodiments, user device 110 may handle processing of video and depth information for a captured 3D space, including generation of a metaverse (a virtual-reality space in which users can interact with a computer-generated environment and other users), 3D mesh, and/or layout and estimation of measurements. However, depending upon the specifics of a given implementation, central server 130 may instead carry out some or all processing of the video and depth data to generate a spatial layout and estimation of dimensions of a 3D space captured by the user device 110. User device 110 may either handle a part of the processing, or simply act to acquire data about a 3D space and provide raw or partially processed data to central server 130 for further processing.

Also shown in system 100 are one or more additional user devices 140 and 150, which may be smartphones, tablets, laptops, desktops, or other servers. These additional user devices 140 and 150 may also be in data communication with the central server 130, and so may receive raw or processed data captured by user device 110 and/or a completed layout and estimation of measurements of the 3D space captured by user device 110. User devices 140 and/or 150 may be capable of interaction with the layout and estimations, as well as a generated 3D mesh or metaverse, received from central server 130. Further still, user devices 140 and 150 may engage in two-way or multi-way interaction with user device 110 through central server 130, with each device commonly working with a generated 3D mesh, metaverse, 2D or 3D layout, and/or estimates of spatial dimensions of the metaverse. It should be understood that devices 140 and 150 are merely examples, and are not indicative of the number or type of devices connected to central server 130; a given implementation may have an arbitrary number of devices connected to central server 130.

User device 110, as mentioned above, is in data communication 120 with central server 130, along with user devices 140 and 150. Data communication 120 may be implemented using any suitable data communication link technology, which may be wired, wireless, or a combination of both. Example communications technologies are discussed below with respect to FIG. 12.

Figure 2:
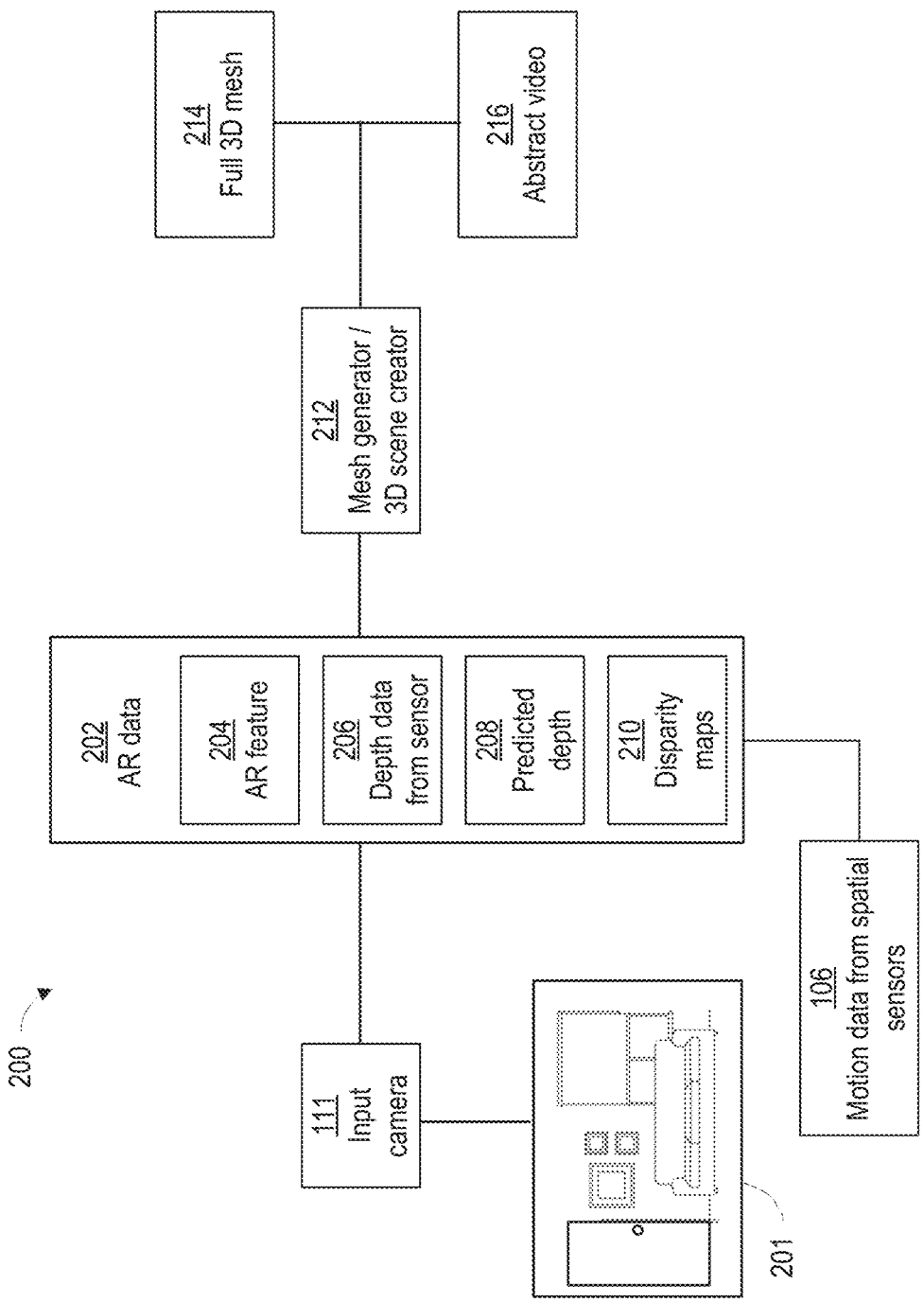
FIG. 2 depicts an example high-level process flow for generating a 3D mesh and virtual reconstruction from a captured video and associated depth data, according to various embodiments.

FIG. 2 depicts an example high-level process flow for generating a 3D mesh and virtual reconstruction from a captured video and associated depth data, according to various embodiments. Process flow 200 may be carried out by one or more components of the system 100, in various embodiments. Initially, a video 201, or one or more images, such as an image of the space 105 of FIG. 1, is captured by an input device, such as the camera 111, along with associated motion data (not depicted). This video 201 is then, in embodiments, partially or wholly processed by the AR application programming interface (API) of the capturing device to generate AR data 202, which may be tagged to the video 201. Examples of an AR API include ARKit, an augmented reality (AR) development platform for iOS mobile devices developed by Apple Inc., and ARCore, a platform for building augmented reality experiences developed by Google LLC.

Note that, as used herein, AR data 202 is not data about AR objects. Rather, AR data 202 includes point cloud data that corresponds to video 201 that may be useful to create a 3D mesh of the captured 3D space, as well as other useful analysis, such as plane detection and semantic segmentation. Furthermore, in some embodiments, the AR API of the capturing device may include semantic segmentation as part of AR data 202.

This AR data 202 may then be used to generate a layout and/or metaverse or virtual representation of the 3D space by a mesh generator/3D scene creator 212. Finally, the mesh and/or 3D scene can be used to generate a full 3D mesh 214, which includes one or more frames from the video 201 (and/or other sources of relevant images) mapped upon the 3D mesh 214 to generate a relatively realistic model. Additionally, an abstract video 216, which may comprise a layout or metaverse model of the scene captured by the camera 111, may be generated from the detected points in the point cloud. The model can then be used in an interactive fashion.

AR data 202 may be captured contemporaneously with and/or extracted from, video 201, and may be tagged to video 201. AR data 202 may include AR feature point data 204, depth data from the sensor 206, motion data from spatial position sensors 112 (shown in FIG. 1), predicted depth data 208, and/or disparity maps 210. Other embodiments may include additional data types, different data types, or fewer data types. The various types of AR data 202 may be derived from various raw data inputs, including Red-Green-Blue (RGB) images (such as the sequence of frames of video 201), intrinsic camera parameters and/or camera transform data (such as from camera 111 and/or spatial position sensor 112), 3D feature points, and/or depth images from a depth sensor (LiDAR, stereo camera, etc.), among other types of possible data. RGB images may be extracted from frames of the video captured by camera 111. An RGB image defines red, green, and blue color components for each individual pixel of the image.

Intrinsic parameters of a camera are parameters that are internal and fixed to a particular camera. These parameters characterize the optical, geometric, and digital characteristics of the camera and include: (1) the perspective projection (e.g., focal length), (2) the transformation between image plane coordinates and pixel coordinates, and (3) the geometric distortion introduced by the optics.

In addition to motion data 106 from spatial position sensor 112, intrinsic camera parameters can include various known or readily determined properties of camera 111, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 111 is focused relatively far away from the camera position, and/or the camera 111 utilizes a small aperture (relatively high f-stop, such as f/8, f/11, etc.), so as to offer a large depth of field.

Camera transforms can include the various variables necessary to transform between the 3D objects within the field of view of camera 111 and the 2D image plane of the camera 111. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 112. Depth images can include imaging captured by a depth-sensitive device, such as a LiDAR sensor or infrared range finder, to allow for direct, and potentially more precise, depth measurements of various points within the scene captured by camera 111. Where direct depth measurements are available, data similar to that available for camera 111 may be used (e.g., intrinsic camera parameters and camera transforms) to process the depth measurements and correlate with the images from camera 111.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 112. Identified features including edges, points, and planes may be used to create a 2D or 3D layout and/or metaverse. Further, these feature points may correspond to segmented portions of the captured 3D scene, such as distinguishing a wall, window, picture, or other planar feature from identified planes such as walls, floor, ceiling, etc.

In embodiments where the video is provided as a file from a past capture, the AR feature points may be stored with the video, and correlated to each video frame. In other embodiments, the AR feature points may be calculated from a raw video without associated depth data using photogrammetric techniques.

Depth data from sensor 206 may include the direct depth measurements, which may be correlated with identified AR feature point data 204 by the AR API. Corollary to or alternative to depth data from sensor 206 includes predicted depth data 208, which the AR API may derive from techniques such as machine learning, or photogrammetry and comparison between proximate frames of the captured video. The depth data from the sensor 206 and the predicted depth 208 may comprise a point cloud that, when interconnected, comprises a 3D mesh, with the points forming the vertices of the mesh polygons such as triangles.

Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/3D scene creator 212 receives the AR data 202 and uses it to generate a 3D mesh, which may then be output as a full 3D mesh 214 and/or an abstract video 216, or layout and/or metaverse. The resulting output from the mesh generator/3D scene creator 212 can be a full 3D mesh 214, where the RGB image from various frames of video 201 are mapped onto a 3D mesh generated using the depth data. Such a process may be considered a type of texture mapping, where the RGB image of various frames are used as texture maps. The full 3D mesh 214 provides a geometric representation of the captured 3D space. The full 3D mesh 214 can be used for various purposes, such as simulating physical interactions with objects in the 3D space represented by the full 3D mesh 214, taking measurements of the represented environment, later exploration or walkthrough, or another suitable purpose.

An abstract video 216 can also be output, which may be or include a virtual representation such as a metaverse, and/or a 2D or 3D layout. As with the full 3D mesh 214, such a layout or virtual representation reflects the physical geometry of the captured 3D space, and may include measurements of the captured space that reflect the actual physical dimension of the captured 3D space. In this respect, the virtual representation/layout/metaverse is equivalent in physical dimensions to the captured 3D space, albeit as a digital representation.

It should be understood that, while the foregoing description and subsequent discussions assume that video 201 is in color, e.g. comprised of a plurality of frames that each include an RGB image, other image formats may be utilized, provided they can supply sufficient information for image segmentation. For example, the image data of each frame may instead be expressed using different color systems such as YUV, HSL (hue, saturation, lightness), CMYK (cyan, magenta, yellow, and key), or another method of expressing color, in alternative embodiments. In still other embodiments, the image information may comprise black and white or greyscale information, with no color information. Further still, other embodiments may utilize a combination of color and greyscale/black and white images.

Figure 3:
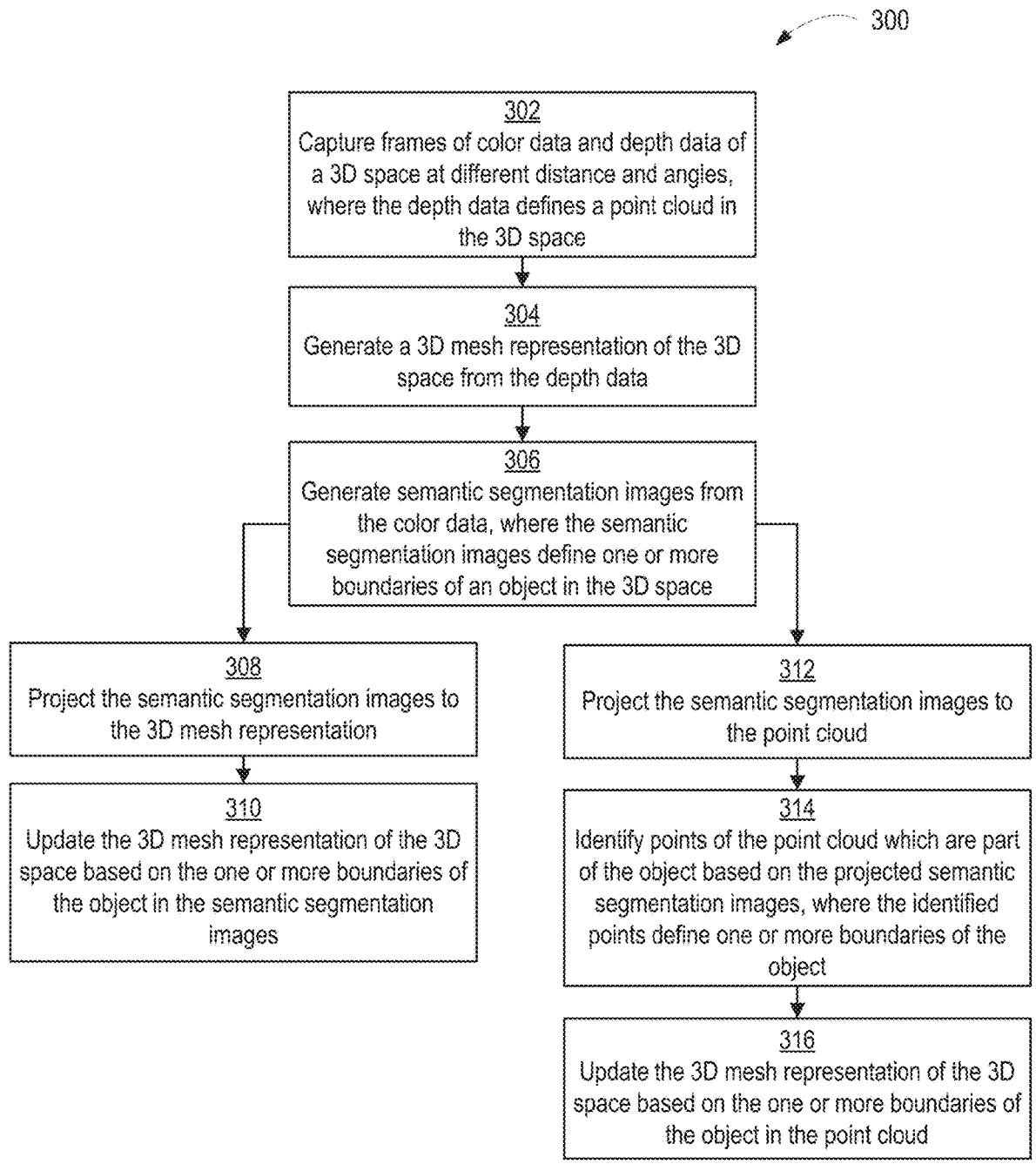
FIG. 3 is a flowchart of the operations of an example method for updating a 3D mesh representation of a 3D space based on semantic segmentation images to better identify boundaries of an object in the space, according to various embodiments.

FIG. 3 is a flowchart of the operations of an example method for updating a 3D mesh representation of a 3D space based on semantic segmentation images to better identify boundaries of an object in the space, according to various embodiments.

Various embodiments may implement only some or all of the operations of method 300, and each of the operations of method 300 may be performed in whole or in part. Some embodiments may add or omit additional operations, or may change the order of operations as may be appropriate for a given implementation. Method 300 may be carried out in whole or in part by one or more components of system 100.

Operation 302 includes capturing frames of color data and depth data of a 3D space at different distances and angles, where the depth data defines a point cloud in the 3D space. The frames of color data may be video comprising RGB data, for instance. The color data can be used to render texture on the mesh model. The captured video may come from a variety of sources. In some examples, a camera attached to or integrated with a capturing device, such as user device 110 with camera 111, is used to capture the video. In other examples, a different device or devices may be used to capture the video that are separate from the capturing device. The depth data may come from, in some examples, other sensors as described above with respect to FIGS. 1 and 2, such as spatial position sensor 112 on a user device 110. In embodiments, the video and depth data are captured contemporaneously to ensure appropriate association between the depth data and corresponding video frames. In this case, pairs of corresponding frames of color data and depth data are captured.

The video and associated depth data may be captured and stored into an appropriate file format that captures the video along with the raw feature points and motion data, before undergoing the processing of the additional steps of the method. Various operations of method 300 may then be performed on the stored video and associated data in post-processing.

Figure 4:
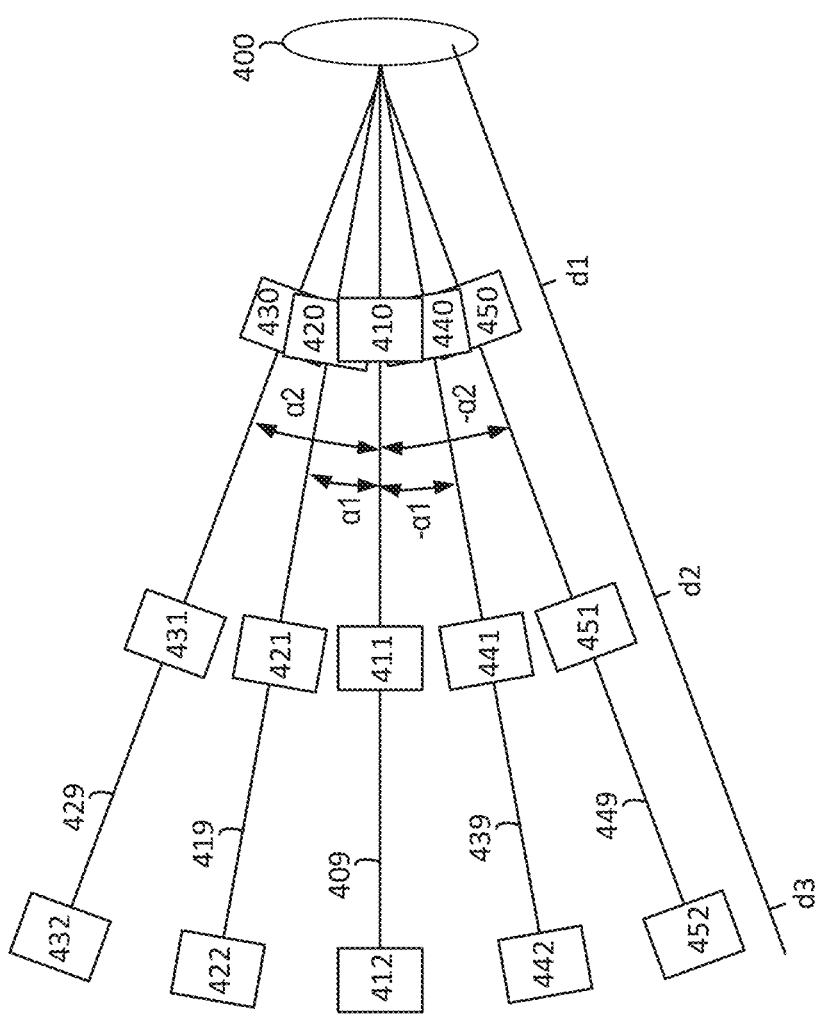
FIG. 4 depicts different camera positions for capturing image and depth data of an object 400 in a 3D space, consistent with step 302 of the method of FIG. 3, and according to various embodiments.

FIG. 4 provides an example of a capturing device at different distances and angles relative to an object.

Operation 304 includes generating a 3D mesh representation of the 3D space from the depth data. This can involve the point cloud of depth data. For example, the 3D mesh could be generated per the process flow 200 described above with respect to FIG. 2. In some embodiments, operation 304 may be performed at least in part by an AR API located on the capturing device, as discussed above with respect to device 110. The point cloud may further be processed to generate a 3D mesh. In one approach, the points in the point cloud are joined into groups of three to form a mesh of triangles. Each of the points then becomes a vertex for one or more triangles, with edges of the various triangles formed by the connection between two adjacent points. In other approaches, various smoothing and filtering processes can be performed on the point cloud before generating the mesh. Generally, the number of vertices in the mesh can be different than the number of points in the point cloud.

In some embodiments, the depth points or the 3D mesh may be at least partially obtained using Simultaneous Localization And Mapping (SLAM), or another suitable technique, which may be carried out on the device by the AR API. SLAM is the computational problem of constructing or updating a map of an unknown environment while simultaneously keeping track of the location of an agent, e.g., camera, within it.

The mesh may be generated and progressively built as the user moves their device in the 3D space. The mesh can be synchronized to the position of the capturing camera as it is generated with a server or other device via a network such as the Internet.

See FIG. 8-10B for example 3D mesh representations.

Operation 306 includes generating semantic segmentation images from the color data, where the semantic segmentation images define one or more boundaries of an object in the 3D space. As will be understood, the objects to be identified in semantic segmentation may be objects that are relatively difficult to distinguish from surrounding structures in a point cloud, such as paintings, windows, and/or doors that do not significantly stand apart from their containing walls, or individual cabinet doors, drawers, dishwashers, built-in refrigerators, and/or trash compactors found in a bank of kitchen cabinets. Such structures would be difficult if not impossible to distinguish from their surroundings if only a point cloud is provided. As mentioned, a semantic segmentation process can be trained to recognize objects. In one approach, the semantic segmentation process is trained to recognize objects which are expected to be found in a particular 3D space. Semantic segmentation can involve assigning a class to every pixel in a given image. The class indicates a type of the object, e.g., wall, door, etc. In one approach, the semantic segmentation process differentiates between different instances of the same object. For example, two different doors in a 3D space can be classified as different types of objects. A unique label is given to each instance of a particular object in an image. This is also referred to as instance segmentation. In another approach, the semantic segmentation process classifies multiple instances of the same type of object with the same label. A semantic segmentation image can assign a different color to each object or instance of an object.

In one approach, classical machine learning techniques such as Support Vector Machine (SVM), Random Forest, or K-means Clustering can be used for semantic segmentation. More recently, deep learning techniques have been developed. Examples include, but are not limited to, a Fully Convolutional Network, U-Net (a convolutional neural network that was developed for biomedical image segmentation), DeepLab (an open source model from Google LLC), and Spatial Pyramidal Pooling (SPP).

Figure 5B:
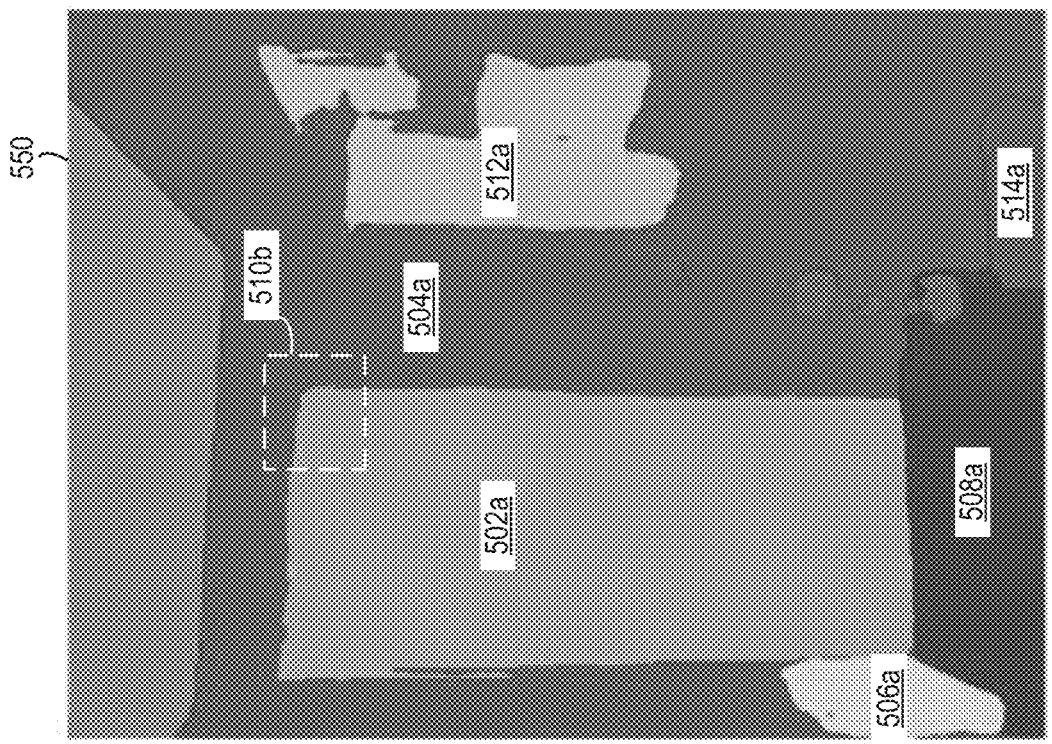
FIG. 5B depicts a semantic segmentation image 550 of the 3D space of FIG. 5A, according to various embodiments.
Figure 6A:
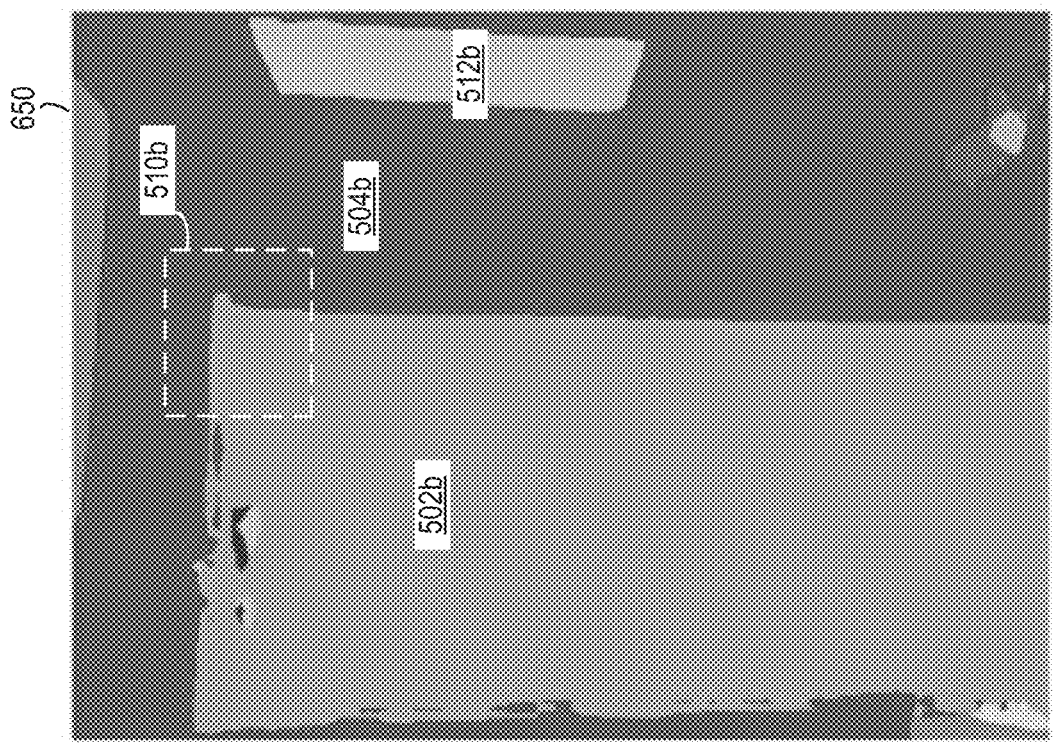
FIG. 6A depicts an example color image 600 of a 3D space, obtained from a camera which is relatively close to the door and wall, consistent with step 302 of the method of FIG. 3, and according to various embodiments.
Figure 6B:
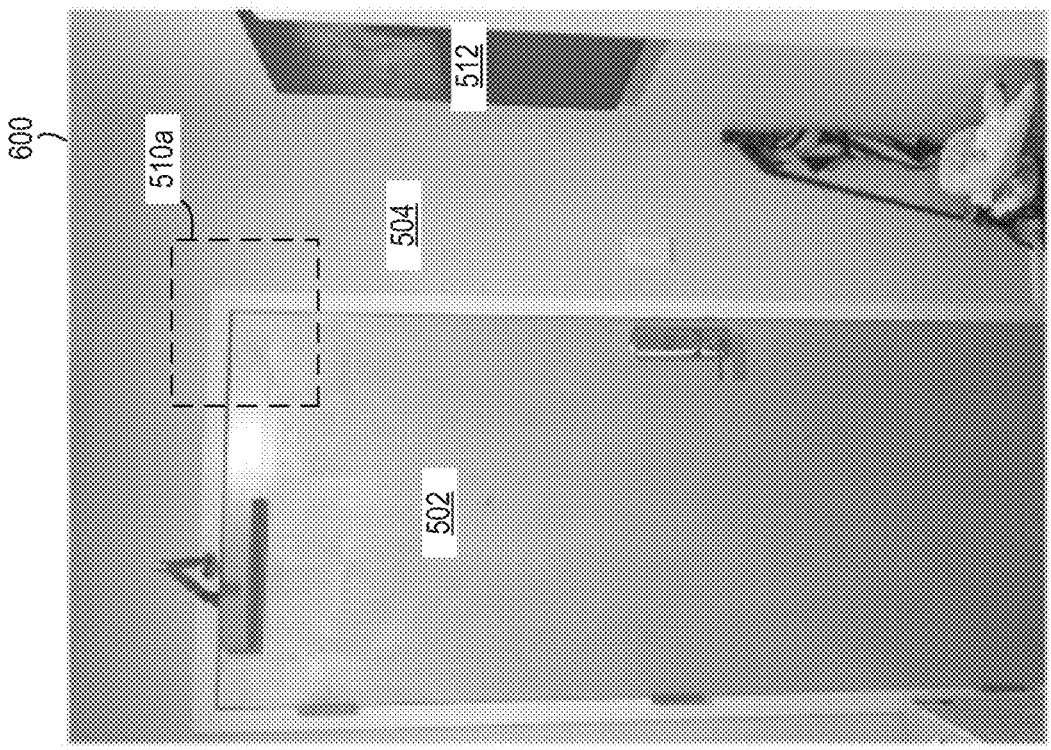
FIG. 6B depicts a semantic segmentation image 650 of the 3D space of FIG. 6A, consistent with step 306 of the method of FIG. 3, according to various embodiments.
Figure 7:
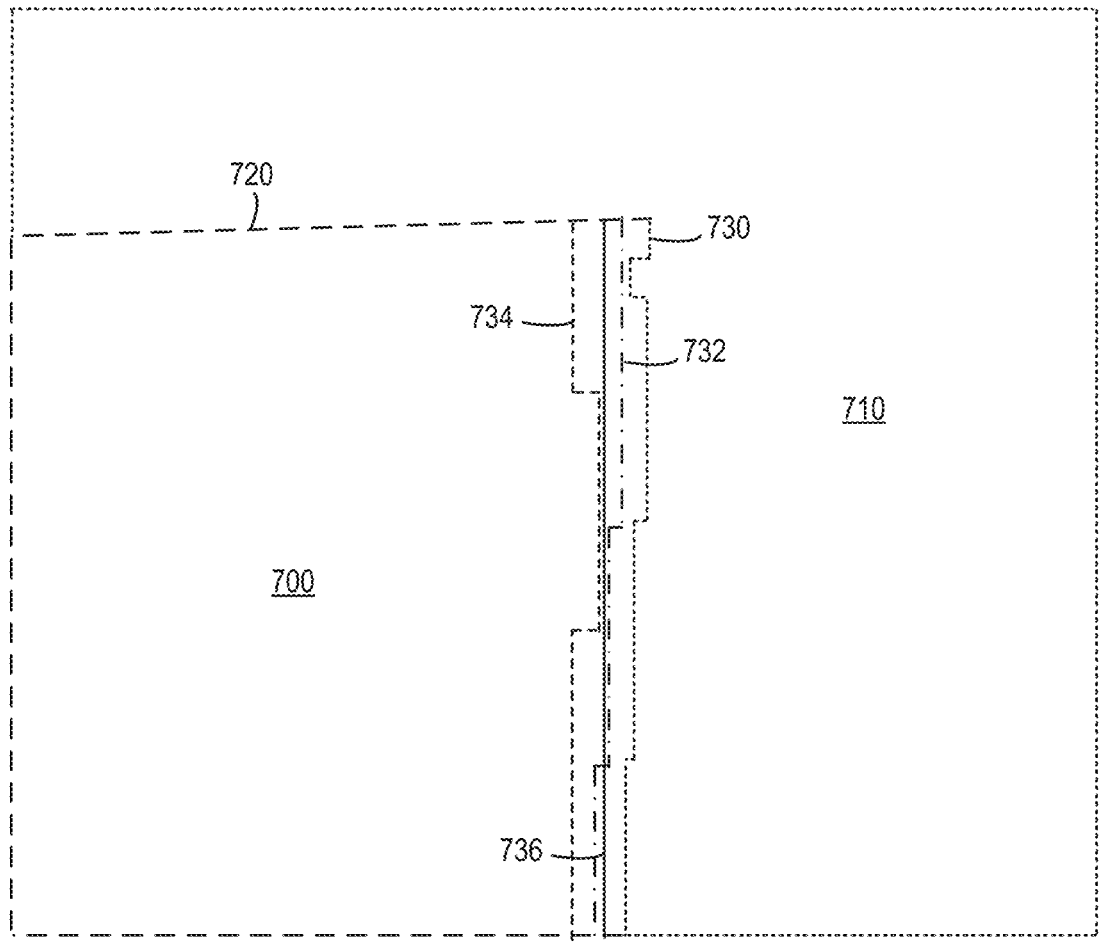
FIG. 7 depicts semantic segmentation images with different boundaries, consistent with the regions 510b of FIGS. 5B and 6B, according to various embodiments.

See FIGS. 5B, 6B and 7 for example semantic segmentation images.

After operation 306, two options are depicted. It is also possible to combine the techniques of the two options. The two options illustrated are two possible embodiments, e.g., the process can be performed on either a point cloud or the 3D mesh (which would be generated from the point cloud).

In a first option, operation 308 includes projecting the semantic segmentation images to the 3D mesh representation. See FIG. 8-10B, for example. Operation 310 includes updating the 3D mesh representation of the 3D space based on the one or more boundaries of the object in the semantic segmentation images. See FIG. 9, for example.

In a second option, operation 312 includes project the semantic segmentation images to the point cloud. The semantic segmentation images can be aligned with the depth images before the projecting. See FIG. 11, for example. Operation 314 includes identifying points of the point cloud which are part of the object based on the projected semantic segmentation images, where the identified points define one or more boundaries of the object. Operation 316 includes updating the 3D mesh representation of the 3D space based on the one or more boundaries of the object in the point cloud.

The first option tends to provide a more straight forward solution and the bandwidth requirement is relatively low. The second option has the potential to be more accurate since it carries the depth map for every frame (more raw data), which also means it needs more bandwidth to store and transmit the depth map to a server (or the other end device). It is also possible to perform the segmentation based on a color point cloud. In this approach, color texture is provided for the point cloud, then the sematic segmentation algorithm is run on the color point cloud to obtain the sematic segmentation point cloud. Both options have the same goal.

Generally, once an object is better identified in the 3D mesh representation via the segmentation process, various measurements can be obtained including the lengths of edges, areas of surfaces, volumes of spaces, distances between objects, and/or any other measurements that could be obtained or approximated from actually measuring the physical 3D space. Thus, the virtual construction approximates or matches the physical size of the captured 3D space. Measurements taken in the virtual construction, which is of an identical scale to the captured 3D space, will be identical, or substantially identical, to if such measurements had been made of the actual 3D space using traditional measurement tools such as a ruler.

Depending upon the capabilities of an implementing system or device, operations 304-316 may be performed progressively while the video is being captured, or may be performed on a complete captured video and associated depth data.

The method provides a number of advantages, including improving the measurement accuracy of the size, region and position of a recognized object. It uses a semantic segmentation process which is trainable for specific objects of interest. Moreover, it can potentially run in real time as image and depth data of a 3D space is captured.

The method provides high accuracy semantic information, e.g., with accuracy at the pixel level, and enhances confidence by using semantic information from multiple different angles and distances, to provide sharp object edges and accurately define the area and position of an object in a 3D space.

FIG. 4 depicts different camera positions for capturing image and depth data of an object 400 in a 3D space, consistent with operation 302 of the method of FIG. 3, and according to various embodiments. As mentioned in connection with operation 302, color and depth data of a 3D space can be captured at different distances and angles from objects in the 3D space. Multiple specified or predetermined angles/distances can be used to optimally capture an object.

By using information captured from different angles/perspective and different distances from an object, greater accuracy can be achieved. For example, a portion of an object which is not visible from one angle may be visible from another angle. Also, a close distance can obtain greater detail while a further distance provides greater context of an object's environment. As another example, noisy image data obtained at one angle/distance could be replaced by good image data obtained at another angle/distance. It is also possible to obtain multiple images at the same angle/distance.

In this example, images are captured by a camera or other capturing device which is positioned at three distances from an object 400, where d1, d2 and d3 are close, medium and far distances, respectively. The capturing device is further positioned at five different angles. For example, a line 409 represents an angle of 0 degree relative to a perpendicular direction from a front surface of the object. Lines 419 and 429 represent small and large positive angles of α1 and α2, respectively, and lines 439 and 449 represent small and large negative angles of −α1 and −α2, respectively.

The capturing device is shown at each of the positions, where each position is represented by a rectangle. For example, positions 410, 411 and 412 correspond to distances of d1, d2 and d3, respectively and an angle of 0 degrees. Positions 420, 421 and 422 correspond to distances of d1, d2 and d3, respectively and an angle of α1 degrees. Positions 430, 431 and 432 correspond to distances of d1, d2 and d3, respectively and an angle of α2 degrees. Positions 440, 441 and 442 correspond to distances of d1, d2 and d3, respectively and an angle of −α1 degrees. Positions 450, 451 and 452 correspond to distances of d1, d2 and d3, respectively and an angle of −α2 degrees.

Note that this example is meant to depict a top down view of a 3D space, so that the angles are azimuth or horizontal angles. It is also possible to move the capturing device to different altitude or elevation angles.

The angles and distances for various positions of the capturing device to capture a given object 400 can be determined before the imaging occurs, in one approach, based on a type of the object as determined by the semantic segmentation process. This determination can be done automatically by software implementing method 300, for example.

For example, for a door, distances of 5, 10 and 15 feet may be used with angles of 0, 10, 20, −10 and −20 degrees. The angles and distances may be selected based on the size and shape of the object and characteristics of the capturing device such as its field of view. For example, the field of view may encompass the full height of a door when the capturing device is a specific distance d3 (relatively far) from the door. This data is useful in distinguishing the entirety of the door. Further, the field of view may encompass one half the full height of the door when the capturing device is a specific distance d2 (an intermediate distance) from the door. Similarly, the field of view may encompass one fourth the full height of the door when the capturing device is a specific distance d1 (relatively close) from the door. The data from the closest distance can be used to obtain more detailed information regarding the shape of a portion of the door, while the data from the intermediate distance can be used to obtained information with an intermediate level of detail. Each level of information can be combined.

Generally, the capturing device may be moved around to many distances and angles in the 3D space. Images obtained at the selected distances and angles can be identified based on a tracked position and orientation of the capturing device. In one approach, the software automatically identifies the images when the capturing device is moved to specific predetermined locations around the space. In another approach, a user is prompted on an interface or otherwise given guidance in moving the camera around to ensure any needed perspectives are captured. FIGS. 5B and 6B provide example segmentation images obtained from a capturing device which is relatively far and close, respectively, from a door object.

Figure 5A:
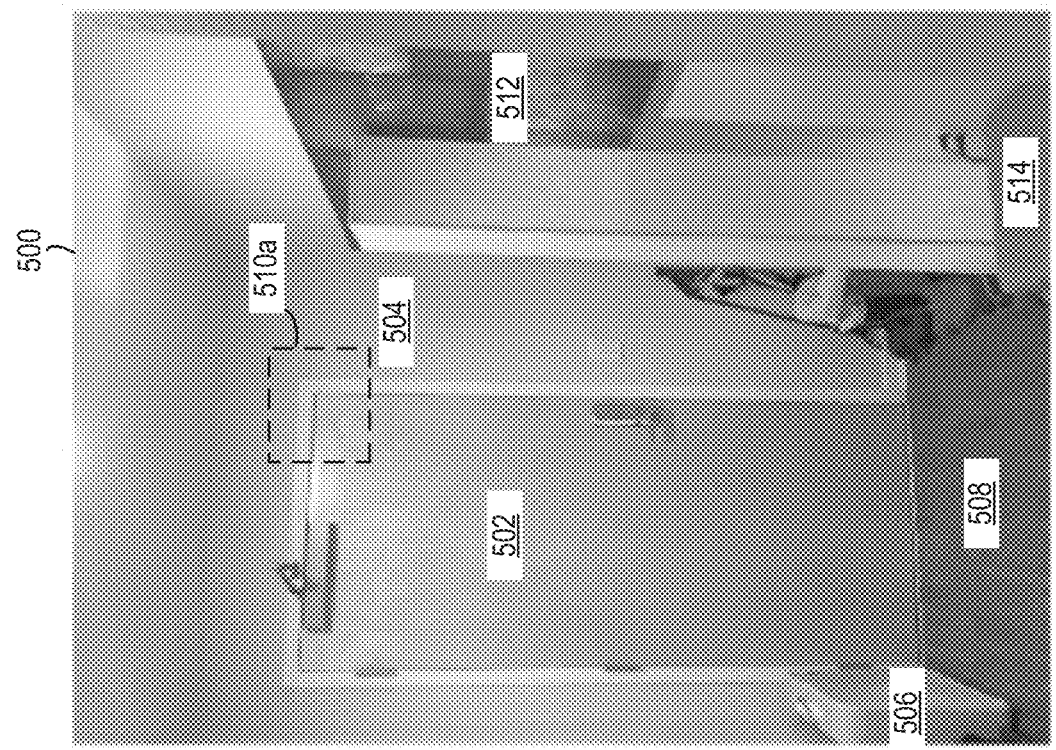
FIG. 5A depicts an example color image 500 of a 3D space 500 including a door and wall, obtained from a camera which is relatively far from the door and wall, consistent with step 302 of the method of FIG. 3, and according to various embodiments.

FIG. 5A depicts an example color image 500 of a 3D space 500 including a door and wall, obtained from a camera which is relatively far from the door and wall, consistent with operation 302 of the method of FIG. 3, and according to various embodiments. The color image can be an RGB image, for example, although the figure is rendered in black and white so that the color is not apparent. The objects are as follows. The image depicts the doorway of an apartment and includes a door 502 (light woodgrain), a surrounding wall area 504 (beige), a floor 508 (dark woodgrain), a box fan 506 (grey), a painting 512 (earth tones) hung on the wall, and a stool 514 (dark beige), among other miscellaneous objects. A portion 510a of the 3D space is depicted as an example area of interest in this and other figures. This region includes the upper right hand corner of the door and a portion of the adjacent wall.

FIG. 5B depicts a semantic segmentation image 550 of the 3D space of FIG. 5A, according to various embodiments. The semantic segmentation image represents the pixels associated with each object with a different shade of grey in this example. The image includes a region 502a representing the door 502, a region 504a representing the surrounding wall area 504, a region 508a representing the floor 508, a region 506a representing the box fan 506, a region 512a representing the painting 512, and a region 514a representing the stool 514. A portion 510b of the 3D space corresponds to the portion 510a of FIG. 5A.

FIG. 6A depicts an example color image 600 of a 3D space, obtained from a camera which is relatively close to the door and wall, consistent with operation 302 of the method of FIG. 3, and according to various embodiments. When the capturing device is relatively close to an object such as the door, the door will appear larger in the frame. The image includes the door 502, the surrounding wall area 504, and the painting 512. The portion 510a of the 3D space is the example area of interest.

FIG. 6B depicts a semantic segmentation image 650 of the 3D space of FIG. 6A, consistent with operation 306 of the method of FIG. 3, according to various embodiments. The image includes a region 502b representing the door 502, a region 504b representing the surrounding wall area 504, and a region 512b representing the painting 512. The portion 510b is again depicted but appears larger than in FIG. 5B.

FIG. 7 depicts semantic segmentation images with different boundaries, consistent with the regions 510b of FIGS. 5B and 6B, according to various embodiments. This example shows boundaries of three different segmentation images which include a region 700 representing the upper right hand portion of the door 502 and a region 710 representing the surrounding wall area 504. The boundaries of the three different segmentation images could be obtained from three different positions of a capturing device, for example. For example, the boundaries 730, 732 and 734 may be obtained from images taken with the capturing device at the positions 410, 411 and 412, respectively, in FIG. 4. In another example, the boundaries 730, 732 and 734 may be obtained from images taken with the capturing device at the different angles of the positions 410, 420 and 430, respectively, in FIG. 4. The use of three segmentation images is an example only as in practice many more can be used.

A horizontal boundary 720 between the semantic segmentation regions 700 and 710 is the same for each of the segmentation images, as a simplification.

However, there are different vertical boundaries 730, 732 and 734 between the semantic segmentation regions 700 and 710 for the three segmentation images. These vertical boundaries are meant to represent the same portion of an object but have small differences.

A line for a vertical boundary 736 is fit to the three vertical boundaries of the semantic segmentation regions to represent a final vertical boundary between the regions 700 and 710 for use in updating a mesh model. As mentioned, the fitting can involve averaging or a regression, for instance. One approach to averaging is to determine an average position horizontally for the vertical boundary of each segmentation image, then obtain an average of these three positions. An example of regression is linear regression where a best fit line is determined for the three boundary lines. In some embodiments, a regression equation is $y=mx+b$ where y is a vertical position in the image, x is a horizontal position in the image and m is the slope of the line.

Note that the shape of the boundary may be known based on the type of the object. For example, a door will have parallel vertical sides and a horizontal top. The fit line can be straight or curved, for instance. In some cases, a boundary of a segmentation image can be discarded if it is an outlier compared to the boundaries of other segmentation images.

If the horizontal boundary between the semantic segmentation regions was different for different segmentation images, a line for a horizontal boundary could be fit to the three different horizontal boundaries of the semantic segmentation regions to represent a final horizontal boundary between the regions 700 and 710 for use in updating a mesh model. This could occur by using different camera elevations, e.g. the third dimension mentioned above in connection with FIG. 4.

The fitting of the line can assign different weights to the different boundaries. For example, the boundaries 730, 732 and 734 may be obtained from images taken with the capturing device at the positions 410, 411 and 412, respectively, in FIG. 4. In fitting the line, a relatively high weight w1 may be applied to the boundary obtained from the close position 410, an intermediate weight w2 may be applied to the boundary obtained from the intermediate position 411, and a relatively low weight w3 may be applied to the boundary obtained from the far position 412, where w1>w2>w3. Thus, among the different boundaries, the fit of the line gives a greater weight to a boundary obtained with the capturing device relatively close to the object than to a boundary obtained with the capturing device relatively far from the object.

Figure 8:
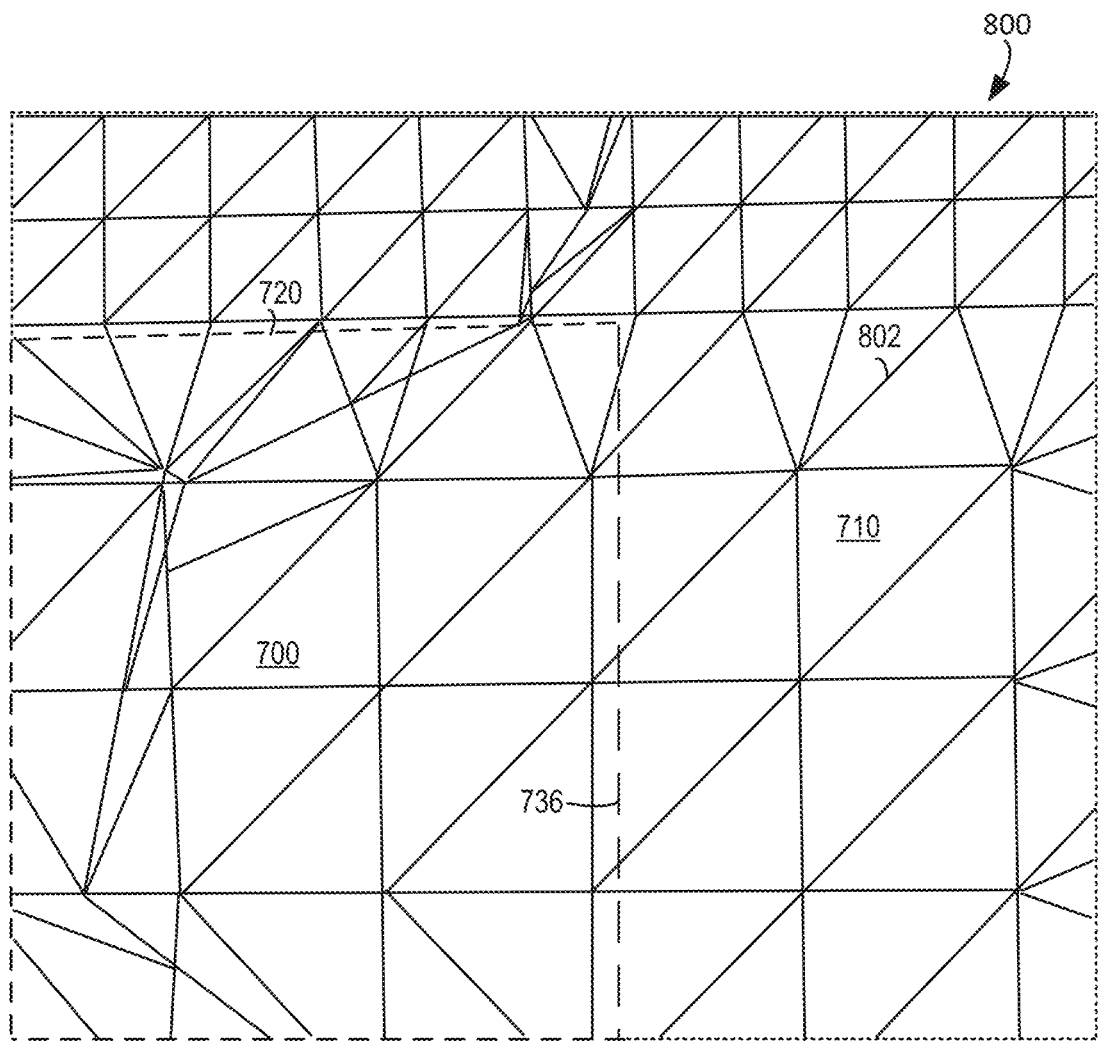
FIG. 8 depicts the semantic segmentation image of FIG. 7, projected onto a mesh representation of a 3D space, consistent with step 308 of the method of FIG. 3, according to various embodiments.

FIG. 8 depicts the semantic segmentation image of FIG. 7, projected onto a mesh representation of a 3D space, consistent with operation 308 of the method of FIG. 3, according to various embodiments. The mesh representation 800 or model includes triangles in this example, where each triangle includes three vertices joined by three edges. An example triangle 802 is depicted. As seen, the edges of the triangles do not closely correspond to the horizontal boundary 720 and the vertical boundary 736 between the semantic segmentation regions 700 and 710. This occurs because the 3D mesh may not accurately identify the various objects, especially when the objects are essentially coplanar, such as a door and a surrounding wall, and therefore at the same distance from the camera.

Figure 10A:
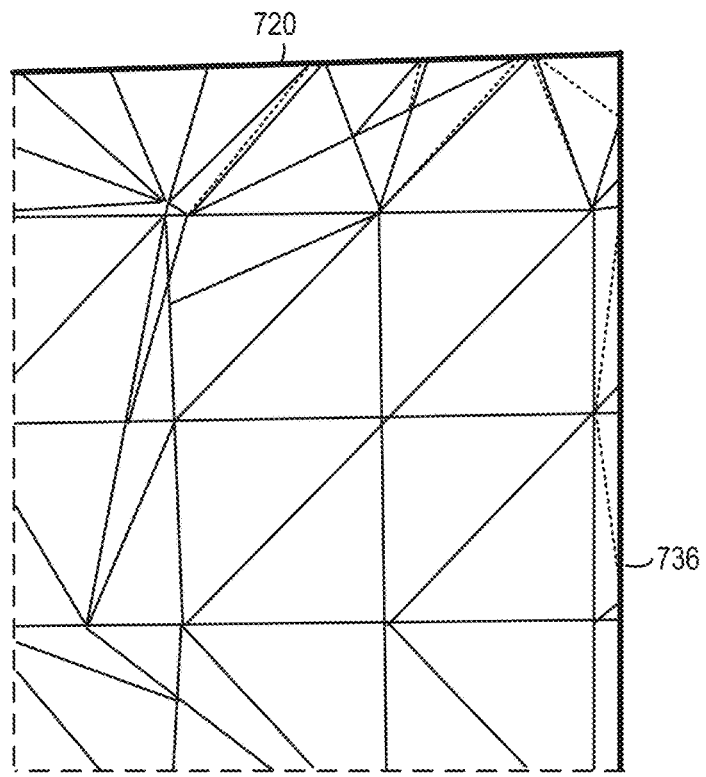
FIG. 10A depicts a mesh representation of the portions 510a of the door of FIG. 5A, respectively, where the mesh representation is updated based on the boundaries 720 and 736 of the semantic segmentation images of FIGS. 8 and 9, according to various embodiments.
Figure 10B:
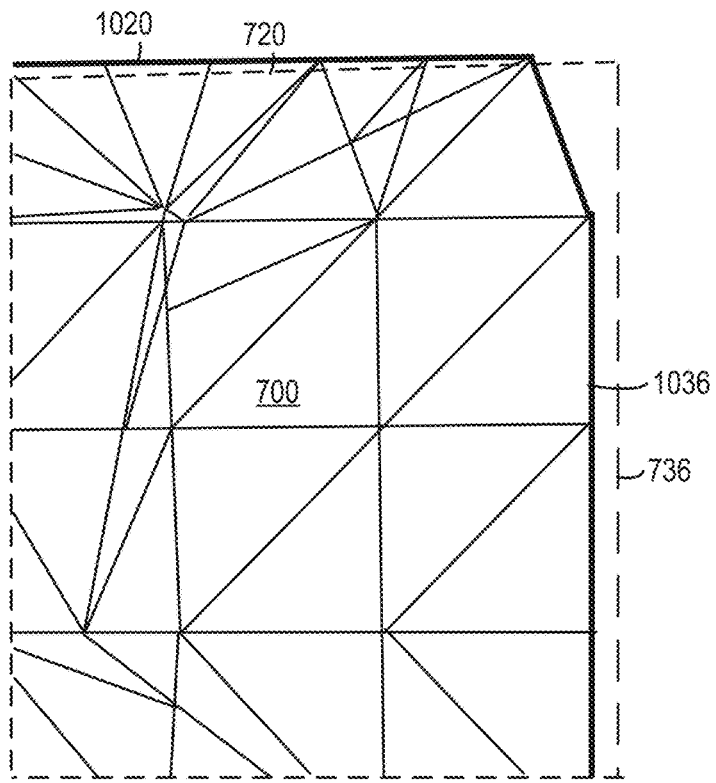
FIG. 10B depicts a mesh representation of the portion 510a of the door of FIG. 5A, respectively, where the mesh representation is not updated, according to various embodiments.

If the boundary was to be represented by the current mesh representation, a horizontal boundary 1020 and a vertical boundary 1036 would be provided as depicted in FIG. 10B. These boundaries are significantly different than the boundaries 720 and 736, respectively, of the semantic segmentation images, which more accurately represent the boundaries of the objects. This results in benefits such as the ability to obtain more accurate measurements of the object. The semantic segmentation images therefore provide additional information which can be used to increase the accuracy of the mesh representation of an object.

Figure 9:
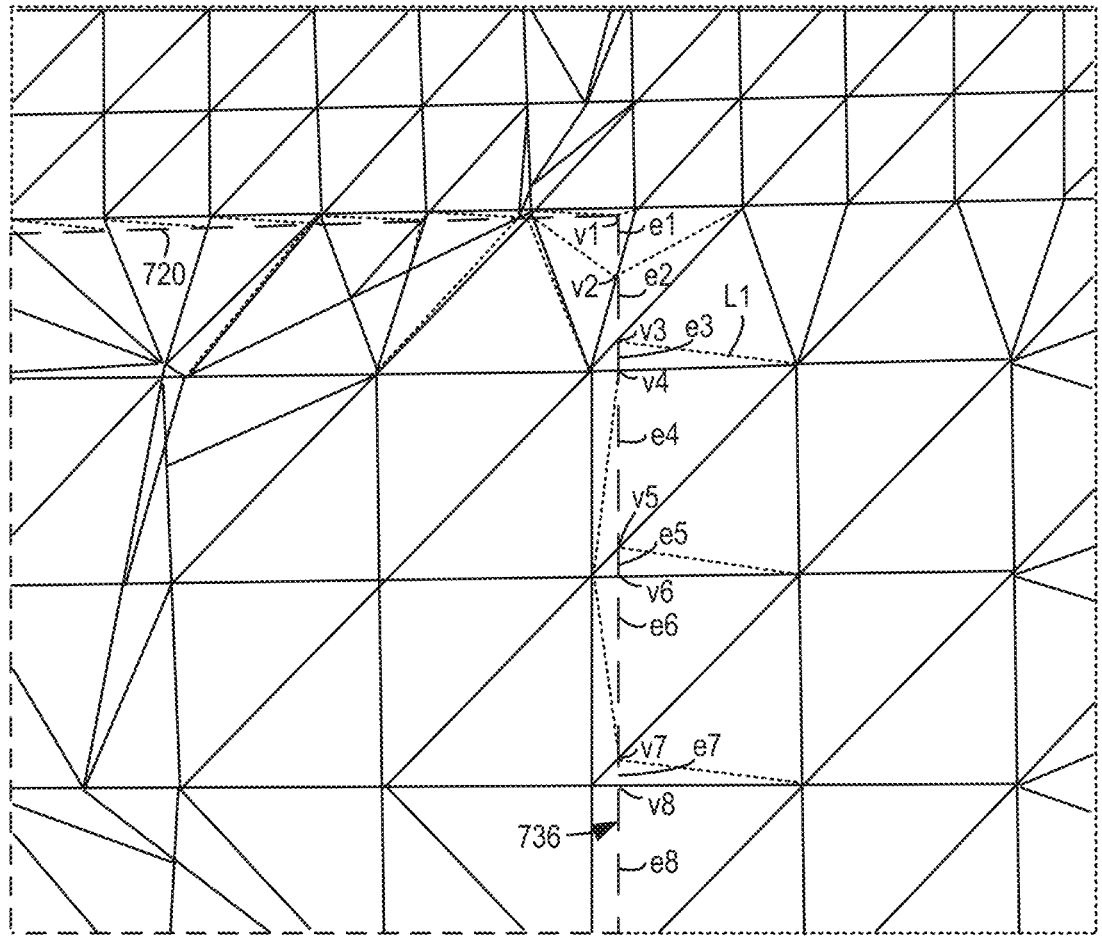
FIG. 9 depicts an updated version of the mesh representation of FIG. 8, according to various embodiments.

FIG. 9 depicts an updated version of the mesh representation of FIG. 8, according to various embodiments. In this case, the faces of the mesh model are divided, sliced or split into multiple new triangles or faces by the vertical boundary 736 and the horizontal boundary 720. For example, the vertical boundary becomes a collection of vertical edges of successive triangles of the mesh, including edges e1-e8. New vertices are formed where the vertical boundary 736 intersects with the existing triangles or faces of the mesh, including vertices v1-v8. The short dashed lines which extend from the new vertices are new edges of the mesh. An example is L1.

Similarly, the faces of the mesh model are divided or sliced by the horizontal boundary 720. The horizontal boundary thus becomes a collection of horizontal edges of successive triangles of the mesh.

In one approach, the one or more boundaries comprise one or more first boundaries (e.g., vertical boundary 736) on one side (e.g., the right side) of the object and one or more second boundaries (e.g., horizontal boundary 720) on another side (e.g., the top side) of the object. A method comprises fitting a first line (e.g., coincident with the vertical boundary 736) to the one or more first boundaries and fitting a second line (e.g., coincident with the horizontal boundary 720) to the one or more second boundaries. In this case, the updating the 3D mesh representation comprises splitting faces of the 3D mesh representation along the first and second lines/boundaries.

FIG. 10A depicts a mesh representation of the portions 510a of the door of FIG. 5A, where the mesh representation is updated based on the boundaries 720 and 736 of the semantic segmentation images of FIGS. 8 and 9, according to various embodiments. The top and right hand boundaries are depicted by the boundaries 720 and 736, respectively, shown as thick lines for emphasis. As mentioned, this approach updates the mesh representation to more accurately represent the boundary or edges of an object in a 3D space.

FIG. 10B depicts a mesh representation of the portion 510a of the door of FIG. 5A, respectively, where the mesh representation is not updated, according to various embodiments. The top and right hand boundaries are depicted by the boundaries 1020 and 1036, respectively, shown as thick lines for emphasis. A significant gap can be seen between the horizontal boundaries 720 and 1020 and between the vertical boundaries 736 and 1036. Essentially, the door would appear to be taller and narrower than it actually is.

Figure 11:
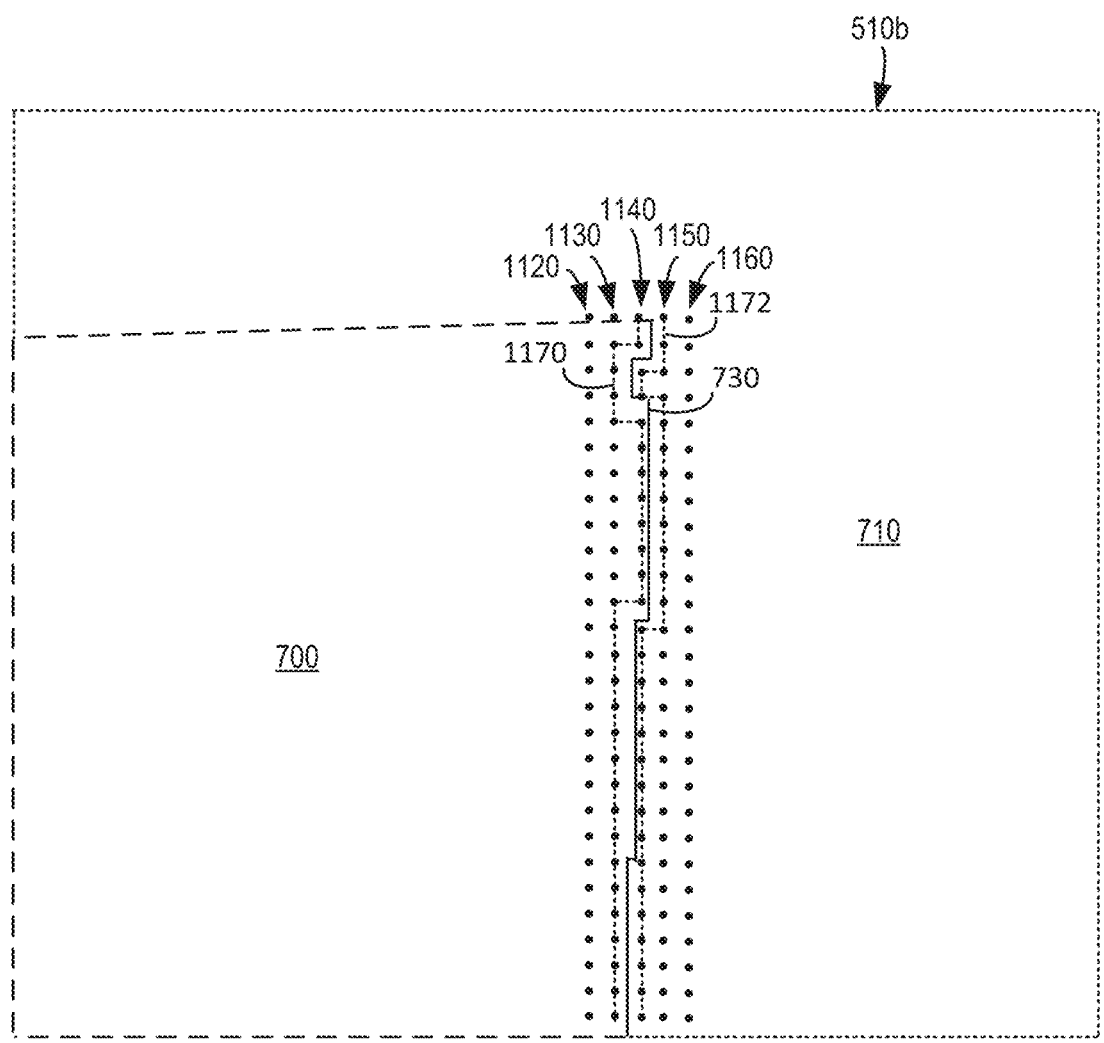
FIG. 11 depicts the semantic segmentation image 550 or 650 of FIG. 5B or 6B, respectively, projected onto a point cloud of a 3D space, consistent with step 312 of the method of FIG. 3, according to various embodiments.

FIG. 11 depicts the semantic segmentation image 550 or 650 of FIG. 5B or 6B, respectively, projected onto a point cloud of a 3D space, consistent with operation 312 of the method of FIG. 3, according to various embodiments. This approach uses the semantic segmentation images and the point cloud of depth data to define one or more boundaries of the mesh representation. The portion 510b of the semantic segmentation image 550 of FIG. 5B is depicted as an example, with the semantic segmentation regions 700 and 710 and the vertical boundary 730 between these regions, consistent with FIG. 7.

Each dark circle represents a depth data point. In practice, the entire image would be filled by the depth data points and the points would not be in a uniform grid. Here, for simplicity, a set of five columns 1120, 1130, 1140, 1150 and 1160 of depth data points are depicted in the area of the vertical boundary 730. A dashed line 1170 runs through the depth data points within, and at an edge of, the semantic segmentation region 700. This line represents a right-hand vertical boundary of the region 700. Similarly, a dashed line 1172 runs through the depth data points within, and at an edge of, the semantic segmentation region 710. This line represents a left-hand vertical boundary of the region 710.

For the door, for example, the vertical boundary 1170 is one example boundary. The process can be repeated to obtain multiple vertical boundaries, where a line is fit (not shown) to provide a final vertical boundary which is used to update the mesh representation, consistent with the example of FIG. 7.

Figure 12:
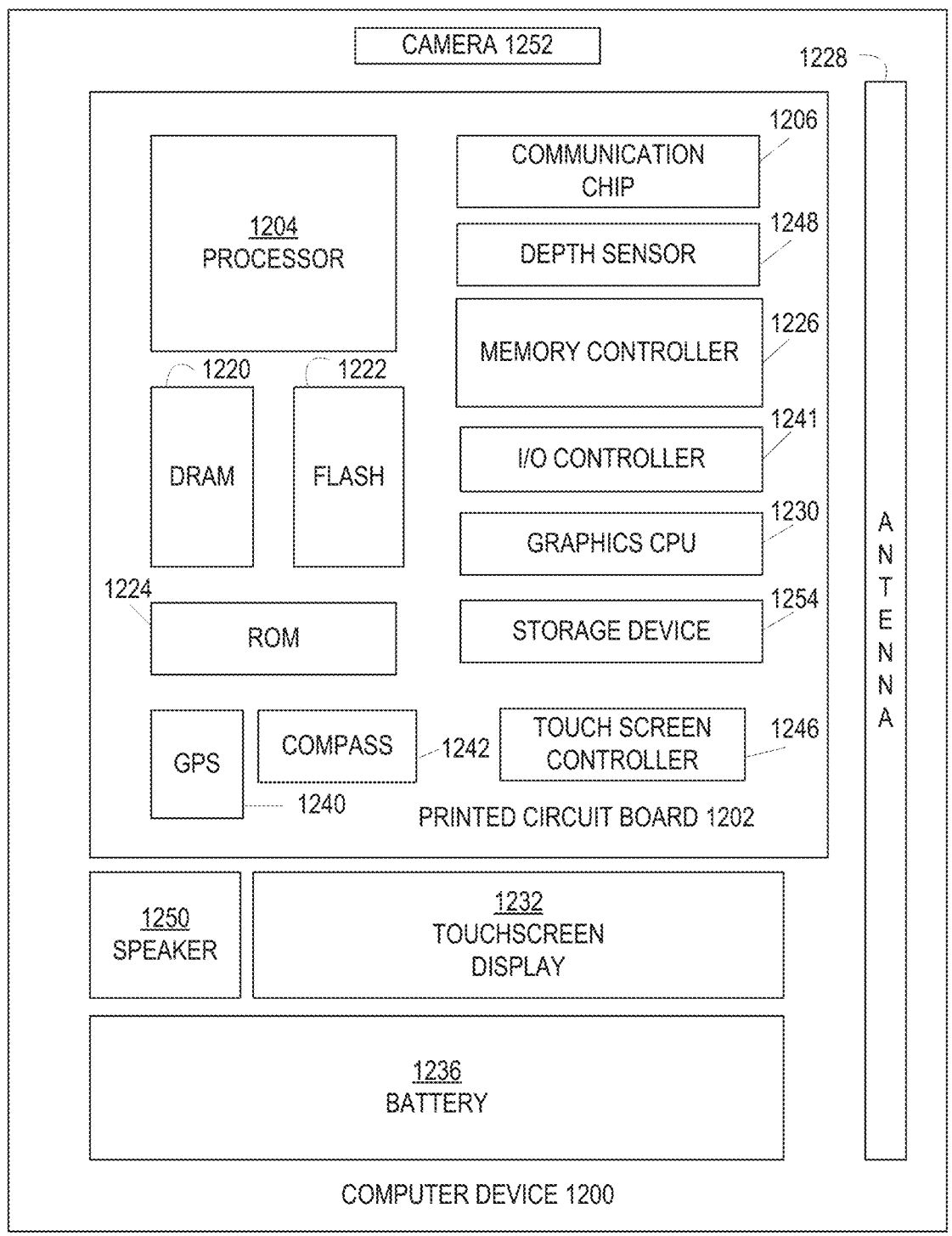
FIG. 12 is a block diagram of an example computer that can be used to implement some or all of the components of the disclosed systems and methods, according to various embodiments.

FIG. 12 illustrates an example computer device 1200 that may be employed by the apparatuses and/or methods described herein, in accordance with various embodiments. As shown, computer device 1200 may include a number of components, such as one or more processor(s) 1204 (one shown) and at least one communication chip 1206. In various embodiments, one or more processor(s) 1204 each may include one or more processor cores. In various embodiments, the one or more processor(s) 1204 may include hardware accelerators to complement the one or more processor cores. In various embodiments, the at least one communication chip 1206 may be physically and electrically coupled to the one or more processor(s) 1504. In further implementations, the communication chip 1206 may be part of the one or more processor(s) 1204. In various embodiments, computer device 1500 may include printed circuit board (PCB) 1202. For these embodiments, the one or more processor(s) 1204 and communication chip 1206 may be disposed thereon. In alternate embodiments, the various components may be coupled without the employment of PCB 1202.

Depending on its applications, computer device 1200 may include other components that may be physically and electrically coupled to the PCB 1202. These other components may include, but are not limited to, memory controller 1226, volatile memory (e.g., dynamic random access memory (DRAM) 1220), non-volatile memory such as read only memory (ROM) 1224, flash memory 1222, storage device 1254 (e.g., a hard-disk drive (HDD)), an I/O controller 1241, a digital signal processor (not shown), a crypto processor (not shown), a graphics processor 1230, one or more antennae 1228, a display, a touch screen display 1232, a touch screen controller 1546, a battery 1236, an audio codec (not shown), a video codec (not shown), a global positioning system (GPS) device 1240, a compass 1242, an accelerometer (not shown), a gyroscope (not shown), a depth sensor 1248, a speaker 1250, a camera 1252, and a mass storage device (such as hard disk drive, a solid state drive, compact disk (CD), digital versatile disk (DVD)) (not shown), and so forth.

In some embodiments, the one or more processor(s) 1204, flash memory 1222, and/or storage device 1254 may include associated firmware (not shown) storing programming instructions configured to enable computer device 1200, in response to execution of the programming instructions by one or more processor(s) 1204, to practice all or selected aspects of process flow 200 or method 300, as described herein. In various embodiments, these aspects may additionally or alternatively be implemented using hardware separate from the one or more processor(s) 1204, flash memory 1222, or storage device 1254.

The communication chips 1206 may enable wired and/or wireless communications for the transfer of data to and from the computer device 1200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1206 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1200 may include a plurality of communication chips 1206. For instance, a first communication chip 1206 may be dedicated to shorter range wireless communications such as Wi-Fi and Bluetooth, and a second communication chip 1206 may be dedicated to longer range wireless communications such as GPS, EDGE, GPRS, CDMA, WiMAX, LTE, Ev-DO, and others.

In various implementations, the computer device 1200 may be a laptop, a netbook, a notebook, an ultrabook, a smartphone, a computer tablet, a personal digital assistant (PDA), a desktop computer, smart glasses, or a server. In further implementations, the computer device 1200 may be any other electronic device or circuit that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 13:
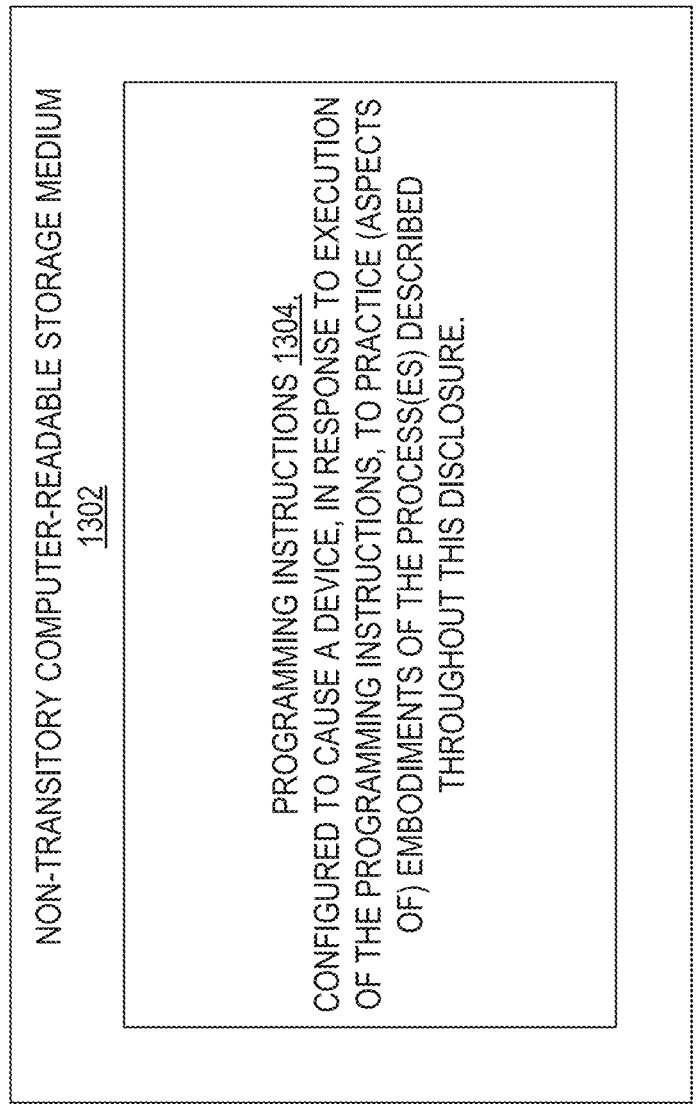
FIG. 13 is a block diagram of a computer-readable storage medium that can be used to implement some of the components of the system or methods disclosed herein, according to various embodiments.

FIG. 13 illustrates an example computer-readable non-transitory storage medium that may be suitable for use to store instructions that cause an apparatus, e.g., a processor or other circuit, in response to execution of the instructions by the apparatus, to practice selected aspects of the present disclosure. As shown, non-transitory computer-readable storage medium 1302 may include a number of programming instructions 1304. Programming instructions 1304 may be configured to enable a device, e.g., computer 1200, in response to execution of the programming instructions, to implement (aspects of) process flow 200 and method 300, as described above. In alternate embodiments, programming instructions 1304 may be disposed on multiple computer-readable non-transitory storage media 1302 instead. In still other embodiments, programming instructions 1304 may be disposed on computer-readable transitory storage media 1302, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:

receiving, from a capturing device, frames of color data and frames of depth data;

generating, from the frames of depth data, a 3D mesh representation of a 3D space;

classifying pixels of the frames of color data as representing an object in the 3D space based on a semantic segmentation process, to generate semantic segmentation images, wherein the semantic segmentation images define one or more boundaries of the object;

projecting the semantic segmentation images to the 3D mesh representation; and updating the 3D mesh representation of the 3D space based on the one or more boundaries in the projected semantic segmentation images, wherein faces of the 3D mesh representation comprise polygons and the updating comprises:
fitting a line to the one or more boundaries;
determining a point at which the line intersects at least one of the polygons; and
splitting the at least one of the polygons into multiple new polygons having a vertex at the point.

2. The method of claim 1, wherein the fitting of the line comprises performing at least one of averaging or a regression.

3. The method of claim 1, wherein the polygons comprise polygons which are intersected by the line, the method further comprising determining respective points at which the intersected polygons are intersected by the line, and splitting each of the intersected polygons into multiple new polygons having a vertex at the respective point.

4. The method of claim 3, wherein:
the line represents a horizontal or vertical boundary of the one or more boundaries of the object; and
the splitting of the each of the intersected polygons results in the horizontal or vertical boundary becoming a collection of horizontal or vertical edges, respectively, of successive polygons of the 3D mesh representation.

5. The method of claim 1, wherein:
the fitting of the line to the one or more boundaries comprises fitting the line to different boundaries of the object obtained with the capturing device at different distances from the object and among the different boundaries, giving a greater weight to a boundary obtained with the capturing device relatively close to the object than to a boundary obtained with the capturing device relatively far from the object.

6. The method of claim 5, wherein the different distances are selected according to the object as defined by the semantic segmentation images.

7. The method of claim 1, wherein:
the one or more boundaries comprise different boundaries of the object obtained with the capturing device at different angles to the object; and
the line is fit to the different boundaries.

8. The method of claim 7, wherein the different angles are selected according to the object as defined by the semantic segmentation images.

9. The method of claim 1, wherein:
the one or more boundaries comprise one or more first boundaries on one side of the object and one or more second boundaries on another side of the object;
the line is a first line which is fit to the one or more first boundaries;
the method further comprises fitting a second line to the one or more second boundaries; and
the updating the 3D mesh representation comprises splitting the polygons along the first and second lines.

10. The method of claim 1, wherein the polygons are triangles.

11. The method of claim 1, wherein the splitting the at least one of the polygons comprises splitting the at least one of the polygons along the line.

12. A non-transitory computer readable medium (CRM) comprising instructions that, when executed by an apparatus, cause the apparatus to:

receive, from a capturing device, frames of color data and frames of depth data, wherein the depth data defines a point cloud in a 3D space;
generate, from the frames of depth data, a 3D mesh representation of the 3D space;
classify pixels of the frames of color data as representing an object in the 3D space based on a semantic segmentation process, to generate semantic segmentation images;
project the semantic segmentation images to the point cloud;
identify points of the point cloud which are part of the object based on the projected semantic segmentation images, wherein the identified points define one or more boundaries of the object;
fit a line to the one or more boundaries; and
divide a face of the 3D mesh representation of the 3D space along the line into multiple smaller faces.

13. The CRM of claim 12, wherein the face is a triangle and the dividing of the face comprises dividing the face into multiple new triangles which have a common vertex at a point at which the face intersects with the line.

14. The CRM of claim 12, wherein:
the fitting of the line to the one or more boundaries comprises fitting the line to different boundaries of the object obtained with the capturing device at different distances from the object and
give a greater weight to a boundary obtained with the capturing device relatively close to the object than to a boundary obtained with the capturing device relatively far from the object.

15. The CRM of claim 12, wherein:
the one or more boundaries comprise different boundaries of the object obtained with the capturing device at different angles to the object; and
the line is fit to the different boundaries.

16. The CRM of claim 12, wherein:
faces of the 3D mesh representation comprise polygons which are intersected by the line; and
the instructions, when executed by an apparatus, cause the apparatus to determine respective points at which the intersected polygons are intersected by the line, and split each of the intersected polygons into multiple new polygons having a vertex at the respective point.

17. A system, comprising:
a processor; and
a storage device in communication with the processor, wherein the storage device includes instructions that, when executed by the processor, cause the processor to:
receive, from a capturing device, frames of color data and frames of depth data;
generate, from the frames of depth data, a 3D mesh representation of a 3D space;
classify pixels of the frames of color data as representing an object in the 3D space based on a semantic segmentation process, to generate semantic segmentation images, the semantic segmentation images define one or more boundaries of the object;
fit a line to the one or more boundaries; and
split faces of the 3D mesh representation along the line, wherein the faces comprise successive polygons which are each intersected by the line at a respective point along the line, and the splitting of the faces comprises splitting each of the successive polygons into multiple new polygons having a vertex at the respective point.

18. The system of claim 17, wherein:
the one or more boundaries comprise different boundaries of the object obtained with the capturing device at different distances from the object; and
among the different boundaries, the fit of the line gives a greater weight to a boundary obtained with the capturing device relatively close to the object than to a boundary obtained with the capturing device relatively far from the object.

19. The system of claim 17, wherein the one or more boundaries comprise different boundaries of the object obtained with the capturing device at different angles to the object.

20. The system of claim 19, wherein the one or more boundaries comprise different boundaries of the object obtained with the capturing device at different optimal distances from the object, and the different optimal distances are based on a type of the object as defined by the semantic segmentation images.

* * * * *